United States Patent [19]

Heinz et al.

[11] 4,439,906

[45] Apr. 3, 1984

[54] METHOD OF PRODUCING TWICE THE NUMBER OF SINGLE OR RIBBON CONDUCTORS IN A PROCESSING MACHINE AND APPARATUS THEREFOR

[75] Inventors: Manigel Heinz; Ströter Hermann, both of Wuppertal, Fed. Rep. of Germany

[73] Assignee: Stocko Metallwarenfabriken Henkels und Sohn GmbH & Co.

[21] Appl. No.: 322,340

[22] Filed: Nov. 18, 1981

[30] Foreign Application Priority Data

Nov. 25, 1980 [DE] Fed. Rep. of Germany ........ 3044319

[51] Int. Cl.³ .................................................. B23P 17/00
[52] U.S. Cl. ........................................... 29/412; 29/415
[58] Field of Search ........................... 29/412, 414, 415; 81/9.51

[56] References Cited

U.S. PATENT DOCUMENTS

| 3,353,571 | 11/1967 | Durr et al. | 140/1 |
| 3,438,126 | 4/1967 | Simon | 29/412 |
| 3,479,717 | 11/1967 | Howard | 29/753 |
| 3,527,124 | 9/1970 | Ullman | 81/9.51 |
| 3,766,624 | 10/1973 | Grebe et al. | 29/704 |
| 4,275,619 | 6/1981 | Shimizu | 81/9.51 |

FOREIGN PATENT DOCUMENTS 1528972 10/1978 United Kingdom .

Primary Examiner—Howard N. Goldberg
Assistant Examiner—Steven E. Nichols
Attorney, Agent, or Firm—Martin A. Farber

[57] ABSTRACT

The present invention relates to a method and apparatus for the manufacture of twice the number of equal lengths of single or ribbon conductors equipped at one end with plugs or connector shells and with insulation stripped at the other end by a device for simultaneously cutting the conductors and stripping the insulation off the conductors. In order to increase the output of the manufacturing process it is proposed that an additional cutting and insulation-stripping device be arranged centrally in the longitudinal direction of the processing machine.

6 Claims, 8 Drawing Figures

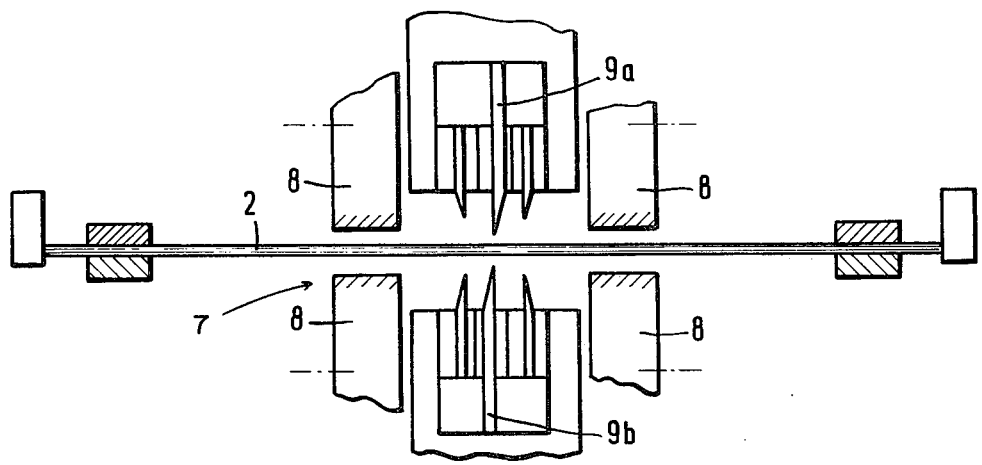
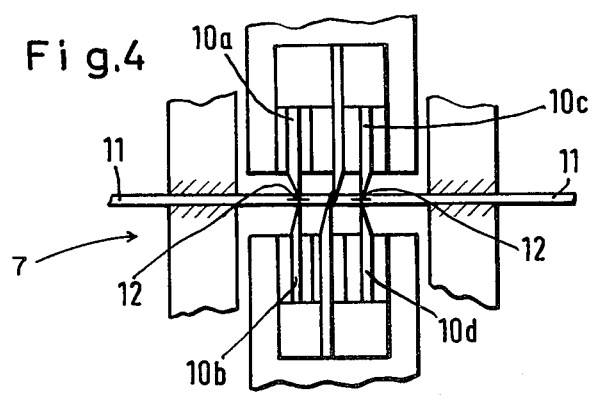
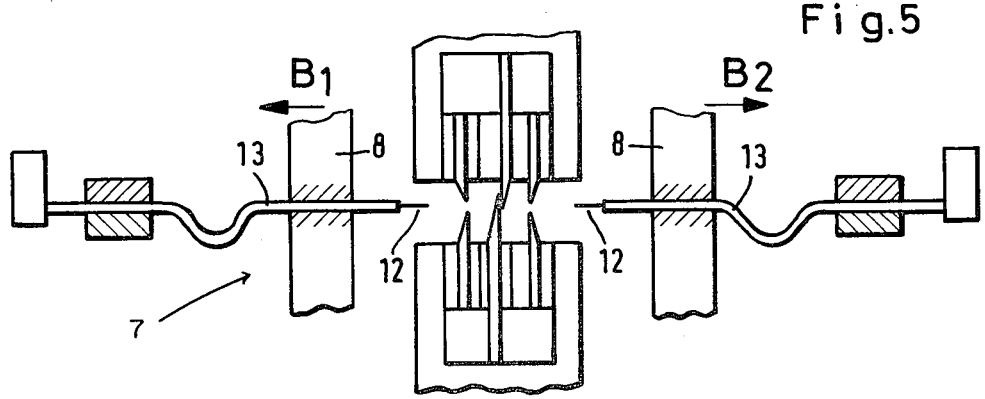

METHOD OF PRODUCING TWICE THE NUMBER OF SINGLE OR RIBBON CONDUCTORS IN A PROCESSING MACHINE AND APPARATUS THEREFOR

The present invention relates to a method of and apparatus for producing twice the number of conductors of equal lengths, which are provided with equipment at one end and are stripped of insulation at the other end, from single or ribbon conductors in a processing machine by a cutting and insulation-stripping device for the simultaneous cutting and stripping of the insulation of conductors, following, for instance, the equipping station in the machine.

Methods are known in which, after the feeding of single or ribbon conductors, via a transport system in the processing machine, the conductors exit from the machine equipped in a final manner at both ends with equipment, such as for example lugs or connector shells. The equipment is added by means of equipping devices provided on both sides of the machine, or else the conductors are equipped at only one end and are cut and the insulation is stripped at the other end in a cutting and insulation-stripping device.

The conductor equipment depends on the need for same, i.e. either equipping the conductor on both ends or only on one end while the other end is stripped of insulation. Therefore the machine is either provided additionally with an equipping or a cutting and insulation-stripping device on the end where the equipping or insulation-stripping is to be effected or else it is converted in accordance with the foregoing requirement. Such additions to the machine constitute a disadvantage. It is also a disadvantage that the number of conductors, which are equipped by the machine on both ends or are equipped on one end and stripped of insulation on the other end, is always equal to the number of conductors fed to the machine for processing.

In order to increase the output in the event that the conductors are to be both equipped and stripped of insulation, it is an object of the present invention, with a processing machine designed only for equipping of conductors at both ends, to furthermore introduce a cutting and insulation-stripping device in the process path of the machine such that the number of conductors equipped at one end and stripped of insulation at the other end is doubled.

The manner of achieving this objective of producing twice the number of, for instance, conductors of equal lengths is obtained by the invention by an arrangement wherein a cutting and insulation-stripping device is arranged, equally spaced from the longitudinal axes, centrally in the direction of the longitudinal axis of the processing machine.

In one advantageous embodiment of the invention, in order to produce twice the number of conductors of unequal lengths, two cutting and insulation-stripping devices are each arranged at the same distance from the longitudinal axes alongside of each other in the direction of the longitudinal axis of the machine.

Depending on the specific case it may be advantageous also to provide more than two cutting and insulation-stripping devices.

The method of the invention will be explained below with reference to the accompanying diagrammatic drawings of preferred embodiments of the invention, in which:

FIG. 3 shows the cutting and insulation-stripping device in an open position;

FIG. 4 shows the cutting and insulation-stripping device in an operating position, with the conductor being cut and insulation being notched;

FIG. 5 shows the cutting and insulation-stripping device after the closing of the clamping units, with portions of the conductor stripped of insulation;

Figure 1:
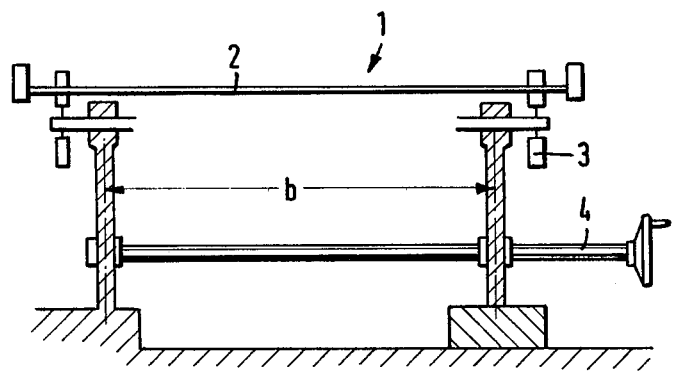
FIG. 1 is a view in elevation of the processing machine in accordance with the present invention.

The diagrammatic showing of the processing machine 1 in FIG. 1 shows, in elevation, an inserted strand of single or ribbon conductors 2, a transport system 3 and a length adjustment device 4 by means of which the width b of the machine is adjusted in accordance with the lengths of conductors 2 to be produced.

Figure 2:
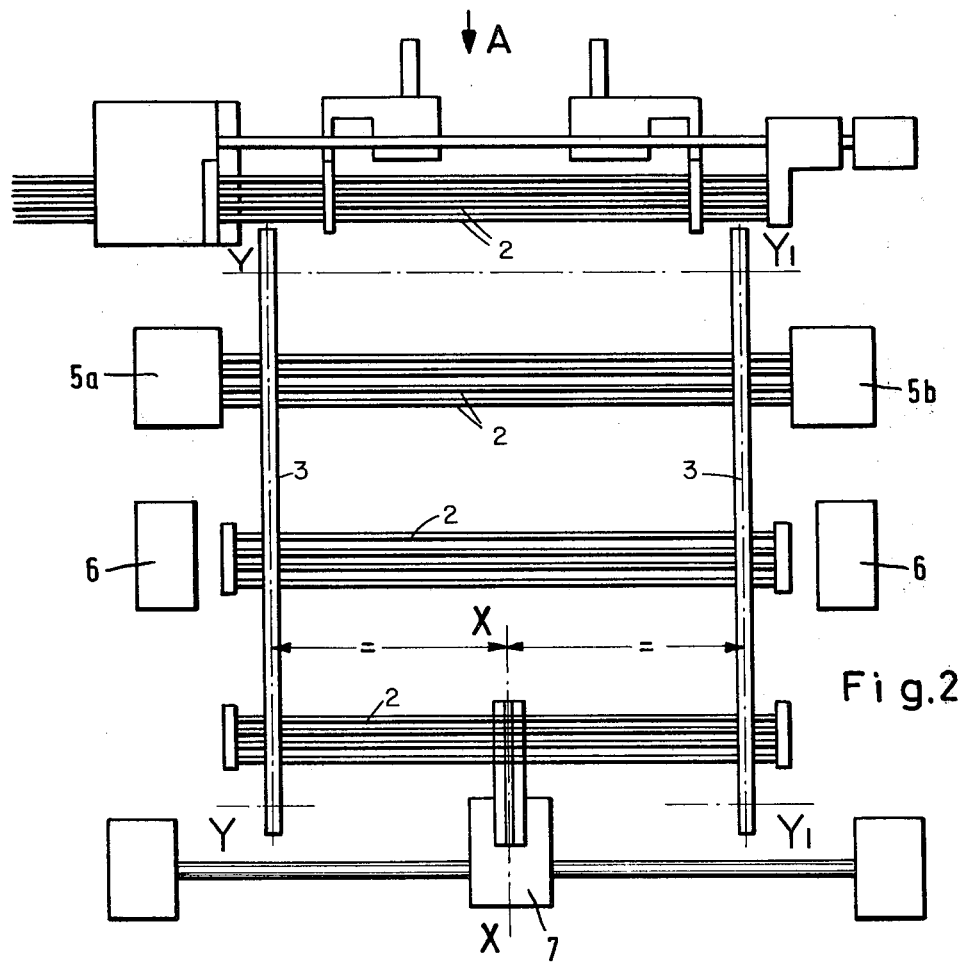
FIG. 2 is a top view of the processing machine of FIG. 1.

As can be noted from FIG. 2, by means of a transport system 3 the conductors 2 are brought in the direction of advance A to equipping devices 5a, 5b which are arranged on both sides and, furthermore to a testing device 6 which may be provided. The conductors 2 are thereupon moved to a cutting and insulation-stripping device 7 arranged centrally with respect to the central longitudinal axis X—X of the processing machine at an equal distance from the longitudinal axes Y—Y, $Y_1$—$Y_1$ of the transport system 3. As illustrated these longitudinal axes of the processing machine and of the transport system are transverse to the direction of the conductors 2. The cutting and insulation-stripping device is shown diagrammatically in FIG. 3 in an open position with the conductors 2 interposed.

On both sides of the cutting and insulation-stripping device 7 there are provided clamping units 8 by which, as shown in the operating position of FIG. 4, the conductors 2 are held fast while at the same time the cutting knives 9a, 9b cut the conductors, and the insulation-stripping knives 10a, 10b and 10c, 10d arranged on both sides thereof cut into the insulation 11 of the conductors 2 down to the conductor core 12. Thereupon the respective clamping units 8 are moved simultaneously in the direction $B_1$ towards the left and in the direction $B_2$ towards the right, the insulation 11 of the conductor 2 which has been cut into equal lengths 13 being stripped off from the conductor cores 12 at the facing ends, as can be noted from FIG. 5.

Figure 6:
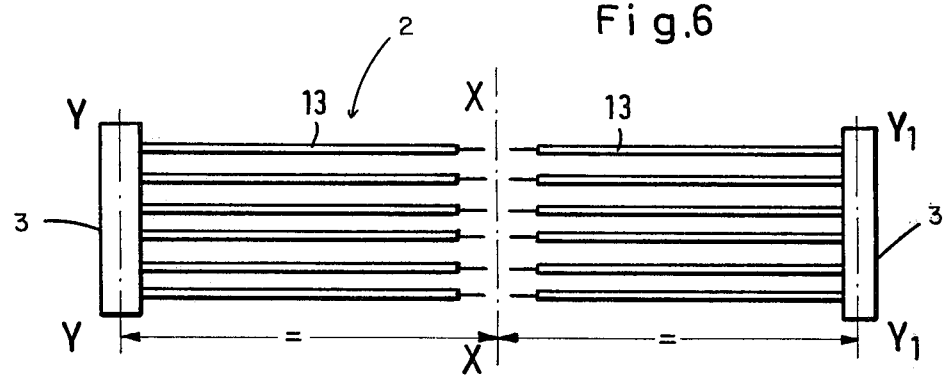
FIG. 6 shows twice the number of conductor of equal lengths.

FIG. 6 shows the conductors 2 cut into equal lengths 13 and stripped of insulation at their adjacent ends, by cutting the conductors 2 centrally in the longitudinal direction X—X located at an equal distance from the longitudinal axes Y—Y and $Y_1$—$Y_1$.

Figure 7:
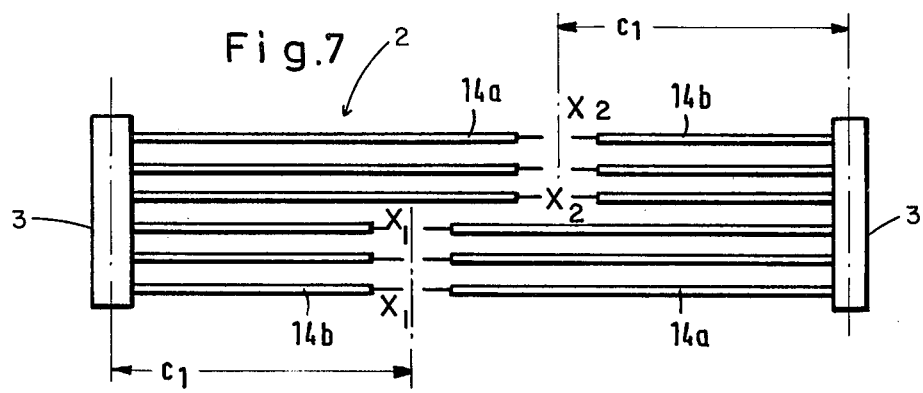
FIG. 7 shows double the number of conductors of unequal length.

FIG. 7 shows the conductors cut into unequal lengths 14a, 14b and stripped of insulation, by cutting the conductors 2 in the directions of longitudinal axes $X_1$—$X_1$ $X_2$—$X_2$, which axes are located at an equal distance $c_1$ from the longitudinal axes Y—Y and $Y_1$—$Y_1$ respectively of the transport system 3.

Figure 8:
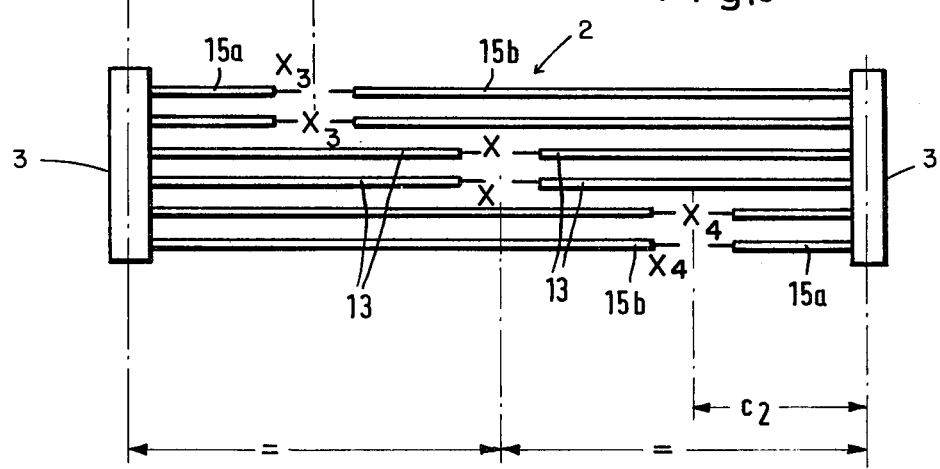
FIG. 8 shows double the number of conductors of equal and unequal lengths.

Finally, FIG. 8 shows some conductors 2 cut into lengths 13, and stripped of insulation by cutting the conductors 2 both centrally in the direction of the longitudinal axis X—X (which is located equidistant from the longitudinal axes Y—Y and $Y_1$—$Y_1$ and some conditions cut into unequal lengths 15a, 15b, by cutting in the direction of the longitudinal axes $X_3$—$X_3$, $X_4$—$X_4$ (each of which axes are spaced by a distance $c_2$ from the direction of the longitudinal axes Y—Y and $Y_1$—$Y_1$ respectively).

We claim:

1. In a method for producing in the same processing machine individual lengths of conductors, which are equipped at one end with plugs or connector shells and at the other end are stripped of insulation, starting out from single or ribbon conductors, transported by a transport system in the processing machine, the conductors being equipped on both ends in an equipping station, the improvement comprising the step of simultaneously cutting and stripping the insulation of the conductors by a cutting and insulation-stripping device following the equipping station in the processing machine, including positioning the cutting and insulation-stripping device to be spaced from first longitudinal axes of the transport system, said first longitudinal axes being transverse to said conductors and adjacent to free ends of said conductors.

2. The method according to claim 1, further comprising the step of arranging two of said cutting and insulation-stripping devices alongside each other at a distance from said first longitudinal axes, respectively, in the direction of second longitudinal axes respectively of the processing machine, said second longitudinal axes being transverse to said conductors.

3. The method according to claim 1, wherein
   the cutting and insulation-stripping device is positioned equally spaced from said first longitudinal axes of the processing machine.

4. The method according to claim 1, wherein
   the cutting and insulation-stripping device is positioned to be unequally spaced from said first longitudinal axes of the transport system.

5. In a method for producing in the same processing machine individual lengths of conductors, equipped at one end with plugs or connector shells and at the other end stripped of insulation, starting out from single or ribbon conductors, transported by a transport system in the processing machine, the conductors being equipped on both ends in an equipping station, the improvement comprising the steps of arranging more than two cutting and insulation-stripping devices alongside each other at an equal distance and at another distance from first longitudinal axes, respectively, of the transport system, said first longitudinal axes being transverse to said conductors.

6. The method as set forth in claim 5, wherein
   one of the cutting and insulation-stripping devices is disposed centrally between said first longitudinal axes of the transport system,
   two other of the cutting and insulation-stripping devices are respectively spaced at said another distance from respective of said first longitudinal axes.

* * * * *